Patented June 20, 1939

2,163,388

UNITED STATES PATENT OFFICE 2,163,388

TREATMENT OF BARYTES

Adolph G. Wuethrich, Wilmington, Del., assignor to E. I. du Pont de Nemours & Company, Wilmington, Del., a corporation of Delaware No Drawing. Application March 17, 1938,
Serial No. 196,371

7 Claims. (Cl. 23—137)

This invention relates to the art of barium sulfate reduction. More particularly it relates to improvements in the manufacture of barium sulfide from barytes. Still more particularly it relates to the removal of impurities from barytes by acid treatment to increase the conversion of barium sulfate to barium sulfide and to improve the quality of the barium sulfide produced.

Barium sulfide, commonly known as barium black ash, which is used so extensively in the manufacture of barium chemicals and the manufacture of lithopone and blanc fixe, is obtained ordinarily by heating ground barytes under reducing conditions in a suitable furnace. Reduction may be effected by a reducing atmosphere such as that of carbon monoxide, hydrogen, or illuminating gas. However, in large scale industrial practice, barium black ash is usually produced by heating ground barytes mixed with from about 15 per cent to about 25 per cent of its weight of finely divided coal in an internally fired rotary furnace for from 3 hours to about 6 hours at a temperature of from about 900° C. to about 1200° C. The reducing operation is performed either as a continuous process or as a batch operation.

The barium black ash resulting from the above operation is lixiviated with hot water to remove the valuable water soluble barium sulfide. The water insoluble residue remaining consists of acid soluble barium compounds and an acid insoluble portion which comprises unreduced barium sulfate, unburned coal and its ash, and the ore gangue. The water insoluble residue is usually of no value and is discarded. In cases where less than 70% of the barium sulfate in the barytes has been converted to water soluble barium sulfide many attempts have been made to refurnace the water insoluble residue in order to increase the recovery. However, such attempts have been unsuccessful because the second refurnacing operation converted but a small percentage of the water insoluble barium compounds to water soluble barium sulfide and the cost of the refurnacing was greater than the value of the product recovered. It is therefore essential in barytes reduction that nearly complete conversion of the barium sulfate to barium sulfide be effected in one furnacing operation. In practice it is desirable for economic reasons that conversion of at least 90 per cent of the barium sulfate to water soluble sulfide be obtained. Furthermore, I have found it desirable that the conversion should be obtained in as short a heating time as possible and at as low a temperature as possible.

While all barytes ore comprises barium sulfate they also comprise varying amounts of such impurities as silica, iron oxide, alumina, manganese dioxide, lime, magnesia, strontium sulfate, and the like. I have found that poorest conversion of barium sulfate to water soluble barium sulfide is obtained with ores containing the highest percentage of impurities and for this reason it is not usually economically feasible by prior art methods to produce barium black ash from barytes ores containing less than about 90 per cent barium sulfate.

As shown by the following analyses of typical barytes ores the composition of such ores which are considered suitable for barium black ash production varies widely.

*Analyses of typical barytes ores*

|  | Poor barytes ore | Good barytes ore |
|---|---|---|
| Percent $BaSO_4$ | 90.54 | 98.54 |
| Percent $SiO_2$ | 5.96 | 0.55 |
| Percent $Fe_2O_3$ | 1.45 | 0.53 |
| Percent $Al_2O_3$ | 0.88 | 0.12 |
| Percent $MnO_2$ | 0.57 | 0.01 |
| Percent $CaO$ | 0.13 | 0.02 |
| Percent $MgO$ | 0.03 | 0.00 |
| Percent $SrSO_4$ | 0.18 | 0.08 |
|  | 99.74 | 99.85 |

As a consequence the optimum conversion of the barium sulfate to water soluble barium sulfide by prior art methods varies from ore to ore. Furthermore, the time and temperature required to obtain optimum conversion for each particular ore is different for each ore.

It has long been recognized that certain impurities, namely fluorspar, silica and alumina have a deleterious effect on the conversion of barium sulfate to water soluble barium sulfide. For example, W. Trantum in discussing the barium industry in the January 1, 1932 issue of Chemistry and Industry reported that for this process it was of the highest importance that barytes should contain no trace of fluorspar and that the barytes should be as free as possible from silica, because otherwise barium silicates are formed which are insoluble in water, and the yield of barium sulfide is considerably reduced. Furthermore, W. Hirschel in Chemiker-Zeitung 50, 692–3 (1936) reported that the presence of silica and alumina in barytes reduces the conversion of barium sulfate to barium sulfide.

A careful study in my laboratory of the effects of the various impurities on the conversion of barium sulfate to barium sulfide has shown that as previously reported, fluorspar has a particularly deleterious effect, due, it is thought, to the fluxing action of the fluorspar and consequent occlusion of considerable quantities of the barytes in the flux which cannot be reduced satisfactorily to barium sulfide. On the other hand it was determined that silica and alumina have much smaller effects on conversion than had previously been considered to be the case. Alumina has little if any effect while silica, except when present to the extent of about 5 per cent or more, decreases conversion not more than about 2 per cent, an amount approximately one-tenth that which it would be decreased if all of the silica reacted with the barium sulfate according to the following equation:

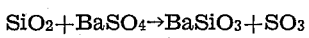

$$SiO_2 + BaSO_4 \rightarrow BaSiO_3 + SO_3$$

It was determined, however, that calcium compounds such as calcium carbonate, calcium sulfate and the like are quite harmful. For example, a barytes ore containing but 0.1 per cent of calcium sulfate gave a conversion of 94% barium sulfate to barium sulfide while a barytes ore, similar in all respects except for the fact that it contained 0.7 per cent of calcium sulfate, gave a conversion of but 90% when reduced under identical conditions. Furthermore, it was determined that the presence of iron oxide even in small amounts decreases conversion markedly. The following table illustrates the effect of barytes iron oxide content on the conversion of barium sulfate to barium sulfide. The data in this table were obtained by reducing in the laboratory under identical conditions barytes ores which contained less than 2% silica and which, except for differing iron oxide content, were essentially comparable in all other respects.

| Barytes ore sample | Percent iron, calculated as $Fe_2O_3$, in barytes | Percent conversion $BaSO_4$ to $BaS$ |
| --- | --- | --- |
| A | 0.07 | 97.6 |
| B | 0.19 | 97.2 |
| C | 0.21 | 96.4 |
| D | 0.33 | 96.1 |
| E | 0.53 | 95.1 |
| F | 0.78 | 94.5 |
| G | 0.81 | 94.7 |
| H | 0.89 | 93.8 |
| I | 0.92 | 93.7 |
| J | 1.06 | 92.8 |
| K | 1.30 | 91.2 |
| L | 1.46 | 90.4 |

It will be noted from the above that an increase in iron oxide content of from 0.07 per cent to 1.46 per cent reduced the barium sulfate conversion from 97.6 per cent to 90.4 per cent, a loss not directly proportional to the ferric oxide content. According to the reaction:

$$BaSO_4 + Fe_2O_3 \rightarrow Ba(FeO_2) + SO_3$$

the above increase in iron oxide content would account for a reduction in conversion from 97.6 per cent to only 95.6 per cent. Hence it appears that ferric oxide not only reacts with barium compounds according to the heretofore described reactions to produce water insoluble barium products but also catalyzes the reaction of other impurities, such as silica, in the barytes ore with the barium compounds such as barium sulfate, barium sulfide, barium oxide and the like which are present in the original ore or which are formed during the reducing process, to produce water insoluble barium compounds in large quantities.

I have determined also that manganese dioxide in barytes ore reduces appreciably the conversion of barium sulfate to water soluble barium sulfide. In addition manganese salts, which are present in barium sulfide solutions obtained from manganese dioxide contaminated ores, have a particularly deleterious effect on the pigment properties of lithopone for example, made from such barium sulfide solutions.

This invention has as an object the improvement of the conversion of barium sulfate to water soluble barium sulfide in the manufacture of barium black ash from barytes ores. A further object is to reduce the extent of the reactions between such impurities as iron oxide, silica, calcium compounds, and the like in the barytes ore with the barium compounds such as barium sulfate, barium sulfide, barium oxide, and the like which are present in the original ore or are formed during the reducing process. A still further object is to increase the yield of water soluble barium sulfide without increasing the time or temperature of the barytes reducing operation. A still further object is the profitable reduction of low grade barytes ores. A still further object is to reduce the formation of agglomerates during the barium black ash manufacturing process. A still further object is to increase the percentage of barium sulfide extracted during the lixiviation operation. A still further object is to improve the quality of the barium sulfide solution obtained from the lixiviation operation. Additional objects will become apparent from an examination of the herein described invention and claims.

These objects are obtained by the following invention which broadly comprises washing the barytes ore prior to the reducing operation with a non-oxidizing acid. In a more restricted sense this invention comprises washing barytes ore with a non-oxidizing mineral acid composition and thereafter reducing said acid washed ore. The preferred embodiment of this invention comprises immersing barytes ore ground between about 4 mesh to about 20 mesh in from about 2.5 normal to about 7.5 normal non-oxidizing mineral acid at an elevated temperature, preferably at about boiling temperature for a period of time between 30 minutes to about 90 minutes, and thereafter reducing the acid washed ore.

The following examples are given for illustrative purposes and are not intended to place any restrictions on the herein described invention.

*Example I*

A sample of a good grade of ground barytes ore which contained 0.77 per cent $Fe_2O_3$ and 0.45 per sent $SiO_2$ was washed with hot 15 per cent hydrochloric acid until its $Fe_2O_3$ content was reduced to 0.06 per cent. The $SiO_2$ content was also reduced to 0.20 per cent by this treatment. The treated ore was washed with water to remove the acid and was dried. 250 gram portions of the dried acid washed ore and of the unwashed ground ore were mixed with 50 grams of a finely divided coal and were reduced under identical conditions for 3 hours at 1000° C. in an internally gas fired rotating laboratory furnace. 90.0 per cent conversion of barium sulfate to water soluble barium sulfide was obtained with the unwashed barytes while the acid washed ore gave a conversion of 98.3 per cent.

*Example II*

A sample of ground barytes ore which contained 1.67 per cent $Fe_2O_3$ was boiled for 30 minutes in 50 per cent sulfuric acid, washed with water to remove the acid and dried. This treatment reduced the Fe₂O₃ content to 0.07 per cent. 250 gram portions of the dried acid washed ore and of the unwashed ground ore were mixed with 50 grams of a finely divided coal and were reduced under identical conditions for 3 hours at 1000° C. in an internally gas fired rotating laboratory furnace. The untreated ore gave a conversion of barium sulfate to water soluble barium sulfide of 79 per cent while a conversion of 97 per cent was obtained with the acid washed barytes.

*Example III*

A sample of ground exceptionally low grade cheap barytes ore comprising 74.1 per cent $BaSO_4$ and 3.9 per cent $Fe_2O_3$ was boiled for 20 minutes in 30 per cent hydrochloric acid, washed with water to remove the acid and dried. The treated ore comprised 82.4 per cent $BaSO_4$ and 0.3 per cent $Fe_2O_3$. 250 gram portions of the dried acid washed ore and of the unwashed ground ore were mixed with 50 grams of a finely divided coal and were reduced under identical conditions for 3 hours at 1000° C. in an internally gas fired rotating laboratory furnace. The untreated ore gave a conversion of barium sulfate to water soluble sulfide of 76 per cent. Although the acid washed ore was of poor color and worthless as a barium sulfate pigment it gave a conversion of 93 per cent.

*Example IV*

Two samples of ground barytes ore mixed with 1.25 per cent of iron filings were boiled for 1 hour in 25 per cent sulfuric acid, washed with water to remove the acid and dried. 250 gram portions of the dried acid washed ores and of the unwashed ground ores were mixed with 50 grams of a finely divided coal and were reduced under identical conditions for 3 hours at 1000° C. in an internally gas fired rotating laboratory furnace. In the following table are recorded the compositions of the ores before and after acid washing and the conversions of barium sulfate to barium sulfide obtained with the several ores.

|  | Ground barytes Sample A | | Ground barytes Sample B | |
| --- | --- | --- | --- | --- |
|  | Before acid washing | After acid washing | Before acid washing | After acid washing |
| Percent $BaSO_4$ in barytes | 96.92 | 97.86 | 97.38 | 97.86 |
| Percent $SiO_2$ in barytes | 1.83 | 1.75 | 1.50 | 1.45 |
| Percent $Fe_2O_3$ in barytes | .28 | .02 | .33 | .03 |
| Percent $MnO_2$ in barytes | .01 | .00 | .11 | .01 |
| Percent $CaSO_4$ in barytes | .70 | .08 | .10 | .06 |
| Conversion $BaSO_4$ to $BaS$, percent | 90.0 | 97.8 | 94.0 | 98.0 |

It will be noted that with ores acid washing improved conversion markedly. The greater increase was obtained in the case of the ore from which was removed the larger amount of the deleterious impurity calcium sulfate.

Various arrangements and selections of equipment for the operation of my process are possible. I prefer, however, to place the ground barytes in a basket with a bottom made of some filtering medium, immerse the whole in acid in a vat of suitable size, and boil sufficiently long to reduce the impurities to the limits desired. After boiling, the basket is set on a filter, the remaining acid sucked out, and then washed with water until substantially free from acid and water soluble salts. The washed barytes is then dried in a suitable dryer and reduced by heating it with coal and the like by any of the methods commonly used in the manufacture of barium black ash from barytes.

The type and concentration of acid and the temperature and time of washing operation required for any particular barytes ore can best be learned by experimental trial and will vary with the fineness, composition, and amount of impurities in the ore and the per cent conversion of barium sulfate to barium sulfide desired. Appreciable effects are obtained by immersing barytes ore ground to about 1 mesh in about 1 normal acid at about 50° C. for about 10 minutes. For increased effects barytes ore ground to about 200 mesh may be immersed in about 20 normal acid at boiling temperature for about 2 hours. However, as stated above, for most ordinary purposes it is preferred to immerse barytes ore ground to from about 4 mesh to about 20 mesh in from about 2.5 normal to about 7.5 normal acid at about boiling temperature for from about 30 minutes to about 90 minutes.

It is to be understood that in place of hydrochloric or sulfuric acid I may use hydrobromic acid, hydriodic acid, hydrofluoric acid, etc. However, superior results are obtained when hydrochloric acid or sulfuric acid is used and they are therefore the preferred acids.

This invention may be applied to all types of barytes ores. As shown in the above examples increased conversions are obtained by acid treatment of high grade ores containing but small percentages of impurities such as ferric oxide and calcium sulfate. However, as is also shown in the aforementioned examples, greatest conversion increases are obtained in the case of low grade cheap barytes ores containing relatively large amounts of impurities. In view of the fact that satisfactory high conversions are obtained by application of this invention to such ores, and because of their relatively low cost and the consequent savings which are effected by their use, it is preferred to apply this invention to low grade barytes ores such as those comprising not more than 90 per cent barium sulfate and not less than about 2 per cent each of ferric oxide and silica. Virgin acids such as pure hydrochloric acid and pure sulfuric acid may be used in practicing my invention. It is preferred when using sulfuric acid to add reducing materials such as scrap iron, sulfur dioxide, and the like to effect solution of manganese dioxide and to accelerate solution of ferric oxide. While virgin acids may be used it is preferred to acid wash the barytes with cheap by-product acids such as waste sulfuric acid from oil refining sludges and waste sulfuric acid from organic chemical sulfonation and nitration manufacturing processes. While the former comprises tarry materials and the latter aromatic compounds which make them unfit for ordinary uses and which impart a definite dark tint to barytes after acid washing in said waste acids, they are particularly effective in the described process and are preferred because of their low cost. Another waste acid material which may be used to advantage in this process is waste sulfuric acid from the hydrolysis step of the process for the production of titanium oxide from ilmenite or similar titaniferous ores.

My process possesses advantages not previously combined in a single process. Acid washing of the barytes ore prior to the reduction operation accelerates the rate at which the barium sulfate is converted to barium sulfide and reduces the quantity of water insoluble barium compounds formed by reaction of impurities in the ore with barium sulfate, barium sulfide and the like. As a consequence the yield of water soluble barium sulfide is increased without increasing the time or temperature of the barytes reducing operation. Furthermore, a yield of water soluble barium sulfide equal to that of the prior art methods may be obtained at a lower temperature and/or in a shorter time with consequent savings in operating expenses. Again, my invention allows the profitable reduction of cheap low quality barytes ores which cannot be worked economically by prior art methods because of their high impurity content. In addition, my process increases the life of the furnace linings used in barium black ash manufacture since the barytes conversion may be affected at lower temperatures. Furthermore, barium black ash agglomerate formation is reduced with the consequent result that the percentage of barium sulfide extracted during the lixiviation operation is increased. In addition, the barium sulfide solution obtained by the lixiviation process contains a much smaller percentage of undesirable impurities such as manganese and the like which adversely affect the qualities of lithopone, for example, prepared therefrom.

As many apparently widely different embodiments of this invention may be made without departing from the spirit and scope thereof, it is to be understood that I do not limit myself to the specific embodiments thereof except as defined in the appended claims.

Having described the present invention, the following is claimed as new and useful:

1. In the manufacture of barium black ash from barytes ore the step which comprises washing the barytes ore prior to the reducing operation with an acid selected from the group consisting of hydrochloric, sulfuric, hydrobromic, hydriodic, and hydrofluoric.

2. In the manufacture of barium black ash from barytes ore the step which comprises washing low grade barytes ore, comprising not more than about 90 per cent barium sulfate and not less than about 2 per cent each of ferric oxide and silica, with an acid selected from the group consisting of hydrochloric, sulfuric, hydrobromic, hydriodic, and hydrofluoric.

3. In the manufacture of barium black ash from barytes ore the steps which comprise washing the barytes ore with between a 1 normal to about a 20 normal an acid selected from the group consisting of hydrochloric, sulfuric, hydrobromic, and hydrofluoric for a period of time between about 10 minutes to about 2 hours.

4. In the manufacture of barium black ash from barytes ore the steps which comprise washing, prior to the reducing operation, a barytes ore ground to between about 1 mesh to about 200 mesh with between a 1 normal to about a 20 normal an acid selected from the group consisting of hydrochloric, sulfuric, hydrobromic, hydriodic, and hydrofluoric at a temperature between about 50° C. to about boiling for a period of time between about 10 minutes to about 2 hours.

5. In the manufacture of barium black ash from barytes ore the steps which comprise washing, prior to the reducing operation, a barytes ore ground to between about 4 mesh to about 20 mesh with between a 2.5 normal to about a 7.5 normal an acid selected from the group consisting of hydrochloric, sulfuric, hydrobromic, hydriodic, and hydrofluoric at about the boiling temperature for a period of time between about 30 minutes to about 90 minutes.

6. In the manufacture of barium black ash from barytes ore the step which comprises washing the barytes ore prior to the reducing operation with sulfuric acid.

7. In the manufacture of barium black ash from barytes ore the step which comprises washing the barytes ore prior to the reducing operation with hydrochloric acid.

ADOLPH G. WUETHRICH.